US006917996B2

(12) United States Patent
Togo et al.

(10) Patent No.: US 6,917,996 B2
(45) Date of Patent: Jul. 12, 2005

(54) BUS CONTROL SYSTEM AND METHOD OF CONTROLLING BUS

(75) Inventors: Kiyotake Togo, Kanagawa (JP); Makoto Nagano, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 365 days.

(21) Appl. No.: 10/217,162

(22) Filed: Aug. 13, 2002

(65) Prior Publication Data

US 2003/0046463 A1 Mar. 6, 2003

(30) Foreign Application Priority Data

Aug. 13, 2001 (JP) ........................................ 2001-245256
Aug. 12, 2002 (JP) ........................................ 2002-234483

(51) Int. Cl.[7] .......................... G06F 13/00; G06F 13/14; G06F 13/20; G06F 13/36
(52) U.S. Cl. ........................ 710/108; 710/105; 710/107; 710/113; 710/240; 710/241; 713/330; 713/400
(58) Field of Search .......................... 710/105, 107–108, 710/113, 240–241, 242, 243; 713/330, 400, 1, 2

(56) References Cited

U.S. PATENT DOCUMENTS 5,873,114 A * 2/1999 Rahman et al. ............. 711/106
5,893,136 A * 4/1999 Stolt et al. .................. 711/105
5,918,025 A * 6/1999 Hayek et al. ................ 710/107
6,112,016 A * 8/2000 MacWilliams et al. ...... 710/107
6,301,642 B1 * 10/2001 Jones et al. ................. 711/151
6,691,224 B1 * 2/2004 Yeh et al. .................... 713/2
6,754,817 B2 * 6/2004 Khatri et al. ................ 713/1
2001/0010063 A1 * 7/2001 Hirose et al. ............... 710/240
2002/0069319 A1 * 6/2002 Lee et al. .................... 711/106

FOREIGN PATENT DOCUMENTS

JP  11-39255      2/1999
JP  2000-66995    3/2000

OTHER PUBLICATIONS

PCI Special Interest Groupt, "PCI Local Bus Bus Specification", Jun. 1, 1995, Revision 2.1, pp. 26, 81, and 272.*

* cited by examiner

Primary Examiner—Paul R. Myers
Assistant Examiner—Ryan Stiglic
(74) Attorney, Agent, or Firm—Rabin & Berdo, PC (57) ABSTRACT

An external bus control device 2 has first and second bus controllers 15, 16 and an external bus arbiter 17. The bus controllers 15, 16 correspond to devices (for example, SRAM, DRAM) connected to an external bus EXBUS respectively. The bus controllers 15, 16 respectively output external bus use request signals BRQ1 and BRQ2, and obtain the right for using the external bus EXBUS. When the bus controllers 15, 16 end use of the external bus EXBUS, the bus controllers 15, 16 stop to output the external bus use request signals BRQ1 and BRQ2 and output off-time signals OFT1 and OFT2 immediately thereafter.

21 Claims, 10 Drawing Sheets

Prior Art

Fig. 3

Prior Art

Fig. 4

Prior Art

Fig. 5

Prior Art

BUS CONTROL SYSTEM AND METHOD OF CONTROLLING BUS

BACKGROUND OF THE INVENTION

1. Field of the Invention

The present invention relates to a bus control system and method of controlling a bus to which two or more devices are connected. Especially, the present invention relates to a bus control system and a method of controlling a bus by using a bus control device having two or more bus controllers, when the device connected to the bus uses a bus.

This application relies for priority on Japanese patent application, Serial Number 245256/2001, filed Aug. 13, 2001, which is incorporated herein by reference in its entirety.

2. Description of the Related Art

The system having one bus line (for example, external bus line) to which two or more devices or apparatus, such as ROM, SRAM and DRAM are connected has been known in this technical field. In this system, a signal, such as a control command, an address, data, etc. output from CPU or a control device, is transferred to each device through the bus line shared between two or more devices.

When two or more deices share one bus line, the devices cannot use the bus line simultaneously. Therefore, use of the bus line is adjusted within a bus control device (or use of the bus line is arbitrated.). In detail, use of the bus line is controlled by controlling operation of two or more bus controllers corresponding to two or more devices. Generally, when a bus use request signal is outputted from two or more bus controllers, a priority is given to these bus use request signals. Grant of using the bus line (grant of bus use request signals) is given to each bus controller according to this priority. The device which gives use permission of the bus line to each bus controller and which sets priority to the bus use request signal output from each bus controller is called a bus arbiter.

Figure 1:
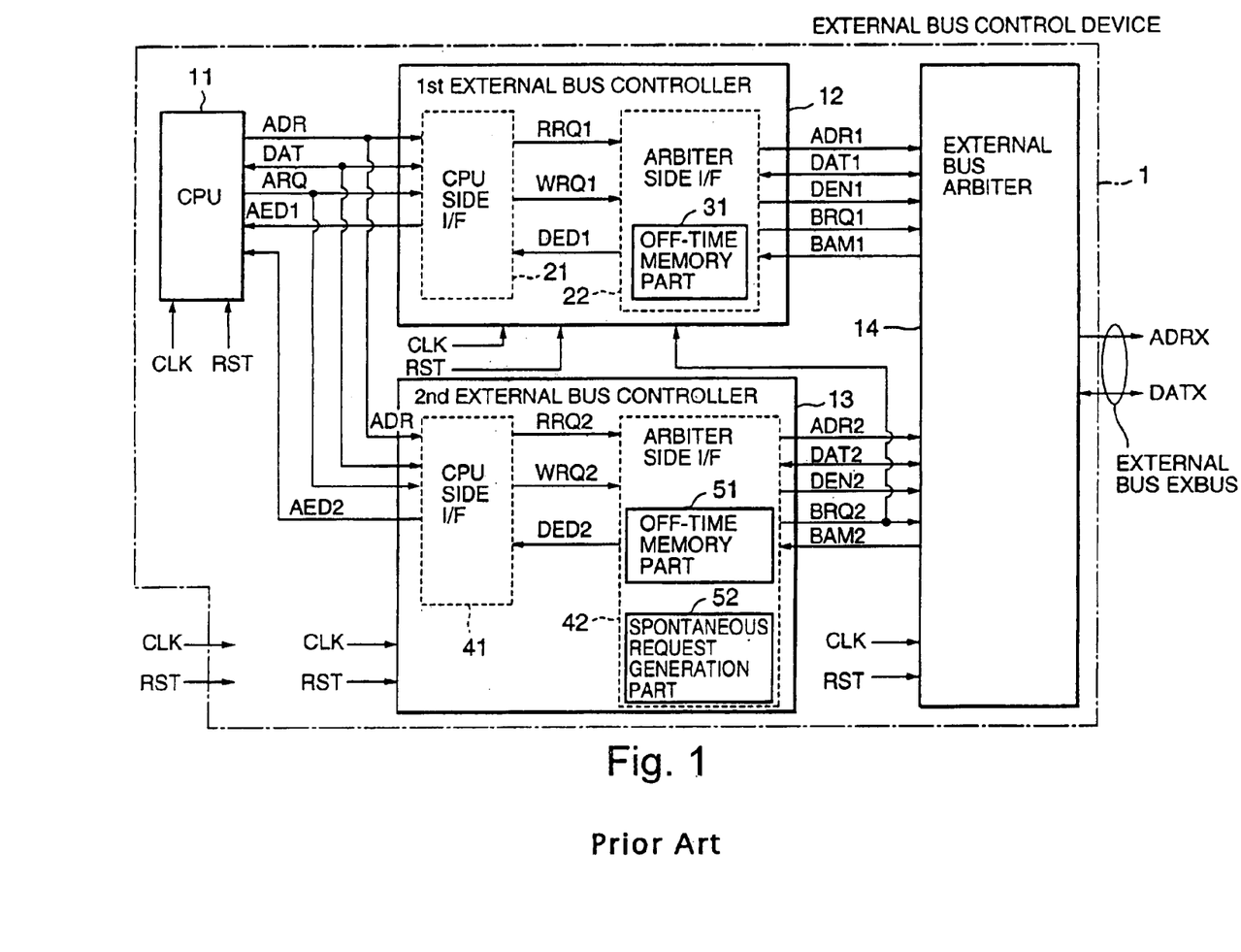
FIG. 1 is the block diagram showing the outline structure of the conventional external bus control device.

FIG. 1 is a block diagram showing an outline structure of a conventional bus control device.

External bus EXBUS is connected to an external bus control device 1. Two or more devices or apparatuses which are not illustrated, such as ROM, SRAM, and DRAM, are connected to the external bus EXBUS.

The external bus control device 1 has a central processing unit (CPU) 11, a first external bus controller 12, a second external bus controller 13, and an external bus arbiter 14.

The central processing unit (CPU) 11 outputs an address signal to the above mentioned device. Moreover, the CPU 11 transmits data to these devices and receives data from these devices. Furthermore, the CPU11 issues an access request to each devices or apparatus. Moreover, the CPU11 receives an end notice of access against each device.

The first external bus controller 12 and the second external bus controller 13 convert a signal outputted from the CPU 11 so that a signal outputted from the CPU 11 may be transferred on the external bus EXBUS.

An external bus arbiter 14 sets up a priority to external bus use request signals outputted from the external bus controller 12 and the second external bus controller 13. And the external bus arbiter 14 outputs a use permission signal of the external bus EXBUS to one of the external bus controllers. Thereby, adjustment (arbitration) is carried out among the bus use request signals.

Moreover, a reset signal RST for initialization and a clock signal CLK used as the base signal of control timing is inputted into each block 11 through 14 illustrated in FIG. 1.

The first external bus controller 12 is a controller which outputs the external bus use request signal based on only the CPU 11. In other words, the first external bus controller 12 is an external bus controller which outputs the external bus use request signal synchronizing with operation of the CPU 11. Hereinafter, such an external bus controller is called an external bus controller of a passive type.

The first external bus controller 12 has a CPU side interface I/F 21 which is an interface part with the CPU 11, and an arbiter side interface I/F22 which is an interface part with the external bus arbitor 14.

In the arbiter side I/F 22, an off-time memory part 31 which stores a value of an off-time period for avoiding that data read-out operation of ROM, SRAM, and DRAM, etc. competes at the external bus EXBUS is provided. The value of the off-time period depends on the types of devices (apparatus) and its operation speed.

The CPU side I/F 21 receives an address signal ADR from the CPU 11, and an access request signal ARQ. Moreover, the CPU side I/F 21 output an access end signal AED1 to the CPU 11. Furthermore, the CPU side I/F 21 transmits data DAT to the CPU11, and receives data DAT from the CPU 11.

Moreover, the CPU side I/F 21 transmits a read-out request BRQ1 and a write-in request WRQ1 to the arbiter side I/F 22, and receive an external bus access end signal DED1 from the arbiter side I/F 22.

The arbiter side I/F 22 transmits an address signal ADR1, a data enable signal DEN1, an external bus use request signal BRQ1, and a data signal DAT1 to the external bus arbiter 14, and receives a data signal DAT1 and an external bus use permission signal BAM1 from the external bus arbiter 14. In addition, each off-time data stored in the off-time memory part 31 shows an extended time period of the external bus use request signal BRQ1 at the time of an end of access to one address. By providing this off-time period, it is prevented that competition of data read-out operation etc. occurs between the present access and next access among the devices connected to the external bus.

The second external bus controller 13 is a controller which can output the external bus use request based on operation of the CPU 11, and a spontaneous external bus use request. The spontaneous external bus use request is a request issued at predetermined interval based on the request from the device connected to the external bus EXBUS like DRAM for which refreshment is needed. In other words, the second external bus controller 13 is a controller which can also output the external bus request signal asynchronously with operation of the CPU 11. Hereinafter, such an external bus controller is called an external bus controller of passive type/spontaneous type.

The second external bus controller 13 has a CPU side interface I/F 41 which is an interface part with CPU 11, and an arbiter side interface I/F 42 which is an interface part with the external bus arbiter 14. In the arbiter side interface I/F42, an off-time memory part 51 which stores a value of an off-time period for avoiding that data-read out operation of ROM, SRAM, DRAM, etc. competes at the external bus EXBUS, and a spontaneous request generation part 52 which generates a spontaneous external bus use request are provided.

The CPU side interface I/F41 receive an address signal ADR from the CPU 11, and an access request signal ARQ. Moreover, the CPU side interface I/F 41 transmits an access end signal AED2 to CPU 11. Furthermore, the CPU side interface I/F 41 transmits a data DAT to the CPU 11, and receives a data DAT from the CPU 11.

Moreover, the CPU side interface I/F 41 transmits a read-out request RRQ2 and a write-in request WRQ2 to the arbiter side interface I/F42, and receives an external bus access end signal DED2 from the arbiter side interface I/F 42.

The arbiter side interface I/F42 transmits address signal ADR2, a data enable signal DEN2, an external bus use request signal BRQ2, and a data signal DAT2 to the external bus arbiter 14, and receives a data signal DAT2 and an external bus use permission signal BAM2 from the external bus arbiter 14. Moreover, the external bus use request signal BRQ2 is transmitted also to the first external bus controller 12, while it is transmitted to the external bus arbiter 14.

Each off-time data stored in the off-time memory part 51 shows the extended time period of the external bus use request signal BRQ2 at the time of an end of access to one address like the off-time memory part 31. By providing this off-time period, it is prevented that competition of date read-out operation etc. occurs between the present access and next access, between the devices connected to the external bus EXBUS.

The spontaneous request generated in the spontaneous request generation part 52 is a refreshment request to DRAM, when the device connected to the external bus EXBUS is DRAM. For every predetermined refresh cycle period, this request is not based on a request from the CPU, but is generated from the spontaneous request generation part 52.

Figure 2:
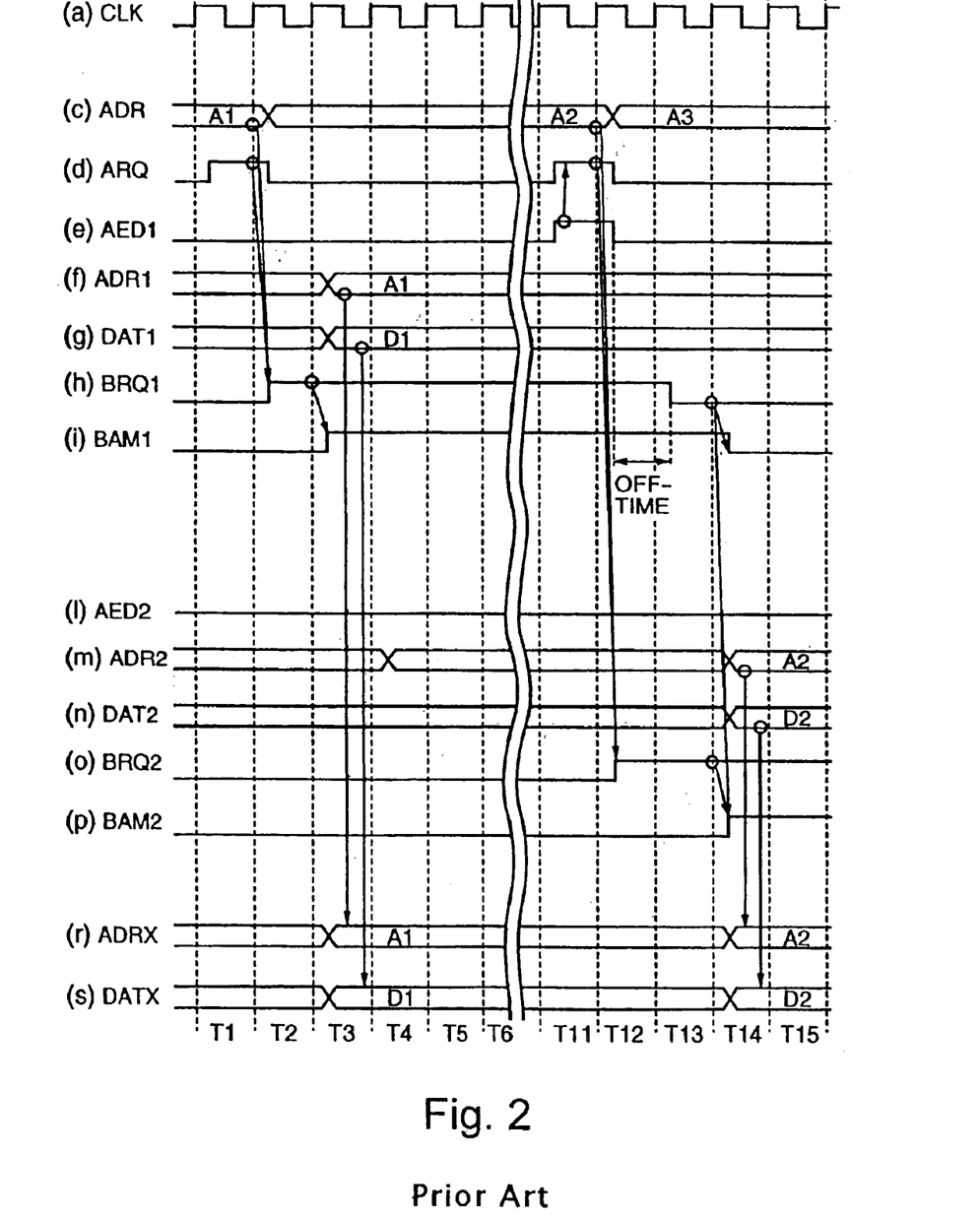
FIG. 2 is a timing chart explaining operation in the 1st mode of the external bus control device shown in FIG. 1.

FIG. 2 is a timing chart in case the second external bus controller 13 transmits the external bus use request signal BRQ2 synchronizing with operation of the CPU. In FIG. 2, each processing is performed in response to the clock timing of T1–T15, for example.

In FIG. 2, (a) denotes the clock signal CLK supplied to each block of the external bus control device 1, (c) denotes the address signal ADR outputted from the CPU 11 to the first external bus controller 12 and the second external bus controller 13, and (d) denotes the access request signal ARQ outputted from the CPU 11 to the first external bus controller 12 second external bus controller 13.

Moreover, (e) denotes the access end signal AED1 which shows an end of access by the first external bus controller 12, (f) denotes the address signal ADR1 outputted from the external bus controller 12 to the external bus arbiter 14, (g) denotes the data DAT 1 outputted and inputted between the first external bus controller 12 and the external bus arbiter 14, (h) denotes the external bus use request signal BRQ1 outputted to the external bus arbiter 14 from the first external bus controller 12, and (i) denotes the external bus use permission signal BAM1 outputted to the external bus controller 12 from the external bus arbiter 14.

In FIG. 2, (l) denotes the access end signal AED2 which shows an end of access according to the second external bus controller 13, (m) denotes the address signal ADR2 outputted to the external bus arbiter 14 from the second external bus controller 13, (n) denotes the data DAT 2 outputted and inputted between the second external bus controller 13 and the external bus arbiter 14, and (o) denotes the external bus use request signal BRQ2 outputted to the external bus arbiter 14 from the second external bus controller 13. (p) denotes the external bus use permission signal BAM2 outputted to the second external bus controller 13 from the external bus arbiter 14.

Moreover, (r) denotes the address signal ADRX transmitted to the external bus EXBUS from the external bus arbiter 14, and (s) denotes the data signal DATX transmitted and received between the external bus arbiter 14 and the external bus EXBUS.

Next, operation of the external bus control device 1 in case the second external bus controller 13 transmits the external bus use request signal BRQ2 synchronizing with operation of the CPU is explained. (This operation is called the first mode.)

Here, it is assumed that the first SRAM and second SRAM are connected to the external bus EXBUS. The address signal A1 is an address which specifies the first SRAM, and the address signal A2 is an address which specifies the second SRAM. In addition, the first external bus controller 12 performs transmission and reception of data to this first SRAM, and the second external bus controller 13 performs transmission and reception of data to this second SRAM.

First, the CPU 11 outputs the address signal A1 to the first external bus controller 12 as the address signal ADR. Furthermore, the CPU 11 outputs the access request signal ARQ having an H level. Access to the first SRAM is started after this. In addition, when this access is the write-in operation to the first SRAM, the write-in request WRQ1 is outputted, and when this access is read-out operation to the first SRAM, the read-out request RRQ1 is outputted. However, explanation is omitted about these requests. (time period T1)

The first external bus controller 12 outputs the external bus use request signal BRQ1 having the H level in response to the access request signal ARQ having the H level. (time period T2)

Next, the external bus arbiter 14 detects that the external bus use request signal BRQ2 of the H level does not exist, in response to the H level of the external bus use request BRQ1, and responses the external bus use permission signal BAM1 having the H level to the first external bus controller 12. Furthermore, the first external bus controller 12 outputs the address signal A1 to the external bus arbiter 14 as the address signal ADR1. Furthermore, the first external bus controller 12 outputs the data signal D1 to the external bus arbiter 14 as the data signal DAT1. The address signal A1 is outputted to the external bus EXBUS as the address signal ADRX and the data signal D1 is outputted to the external bus EXBUS as the data signal DATX based on the transition of the L level to the H level of the external bus use permission signal BAM1. (time period T3)

After that, for example, read-out operation from the first SRAM is performed.

Next, after the access to the first SRAM is completed, the first external bus controller 12 outputs the access end signal AED1 having the H level to the CPU 11. The CPU 11 receives the access end signal AED1 having the H level, and outputs again the access request signal ARQ having H level. The H level of the access request signal ARQ indicates that the following access cycle is started. Moreover, the CPU 11 outputs an address signal A2 to the second bus controller 13 as the address signal ADR in order to start access against the second SRAM in the following cycle. (time period T11)

Next, the second bus controller 13 outputs the external bus request signal BRQ2 having the H level in response to the access request signal ARQ having the H level. In addition, although access to the first SRAM is ended, the H revel of the access request signal BRQ1 is maintained during the off-time period stored in the off-time memory part 31 about the first SRAM. (time period T12)

Next, the external bus arbiter 14 detects that the external bus use request signal BRQ1 is still the H level, and makes the L level of the external bus use permission signal BAM2 maintain. On the other hand, since the off-time period expired, in this time period T13, the H level of the access request signal BRQ1 changes to the L level. (time period T13)

Next, the external bus arbiter 14 detects that the external bus use request signal BRQ1 changes to the L level and responses the external bus use permission signal BAM2 having the H level to the second external bus controller 13 in response to the external bus use request signal BRQ2 having the H level. Moreover, the external bus arbiter 14 changes the H level of the external bus use permission signal BAM1 to the L level in response to the external bus use request signal BRQ1 having the L level.

Furthermore, the second external bus controller 13 outputs the data signal D2 to the external bus arbiter 14 as the data signal DAT2. The address signal A2 is outputted to the external bus EXBUS as the address signal ADRX and the data signal D2 is outputted to the external bus EXBUS as the data signal DATX based on the transition of the L level of the external bus use permission signal BAM2 to the H level. Access to the second SRAM is started after this. That is, it means that the right for using the external bus EXBUS had moved from the first external bus controller 12 to the second external bus controller 13. (time period T14)

Figure 3:
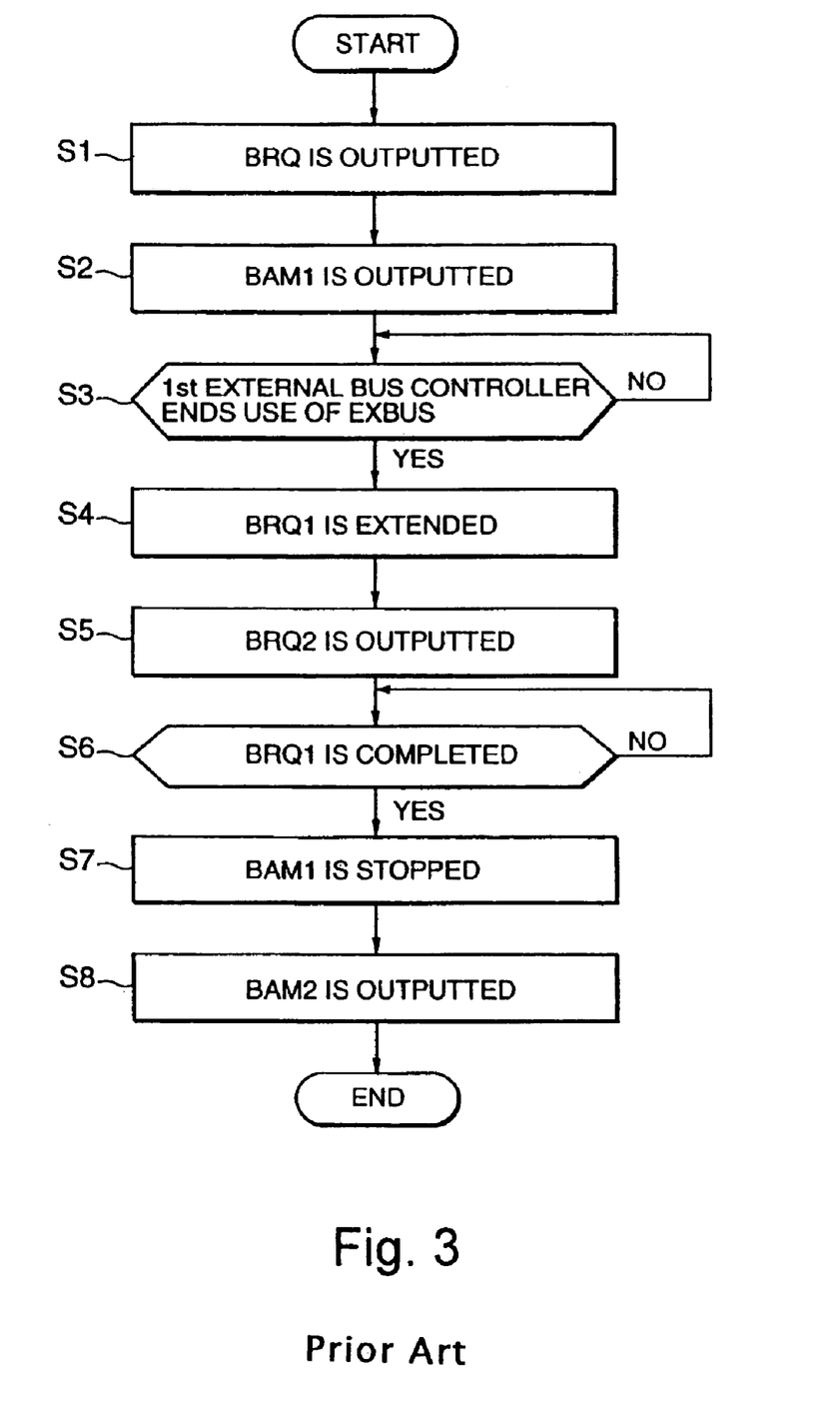
FIG. 3 is a flow chart explaining operation in the 1st mode of the bus control device shown in FIG. 1.

FIG. 3 is a flow chart which shows the outline of operation of the external bus control device 1 which has the second external bus controller 13 which transmits the external bus use request signal BRQ2 synchronizing with operation of the CPU. That is, FIG. 3 is the summary of explanation of operation of the first above-mentioned mode.

The external bus use request signal BRQ1 is outputted. (Step S1)

The external bus use permission signal BAM1 is outputted. (Step S2)

Whether the first external bus controller 12 has ended use of the external bus EXBUS is judged. (Step S3)

When the first external bus controller 12 has not ended use of the external bus, Step S3 is repeated. (Step S3: NO)

When the first external bus controller 12 ends use of the external bus, the external bus use request signal BRQ1 is extended by the off-time. (Step S4)

The external bus use request signal BRQ2 is outputted. (Step S5)

Whether the output of the external bus use request signal BRQ1 extended at Step S4 is completed is judged. (Step S6)

When the output of the external bus use request signal BRQ1 is not ended, Step S6 is repeated. (Step S6: NO)

When the output of the external bus use request signal BRQ1 is ended, the output of the external bus use permission signal BAM1 is stopped. (Step S7)

The external bus use permission signal BAM2 is outputted. (Step S8)

As mentioned above, the second external bus controller 13 which outputs the external bus use request signal BRQ2 synchronizing with operation of the CPU 11 is explained by FIG. 2 and FIG. 3.

Subsequent explanation explains the case where the second external bus controller 13 outputs the external bus use request signal BRQ2 asynchronously with operation of the CPU 11. (This operation is called a second mode.)

That is, the second external bus controller 13 outputs spontaneously the external bus use request BRQ2 for a refreshment request of DRAM connected to the external bus EXBUS.

Here, DRAM is connected to the external bus EXBUS instead of the second SRAM. Therefore, the address signal A2 is an address which specifies DRAM. In addition, the second external bus controller 13 performs transmission and reception of data to this DRAM.

Figure 4:
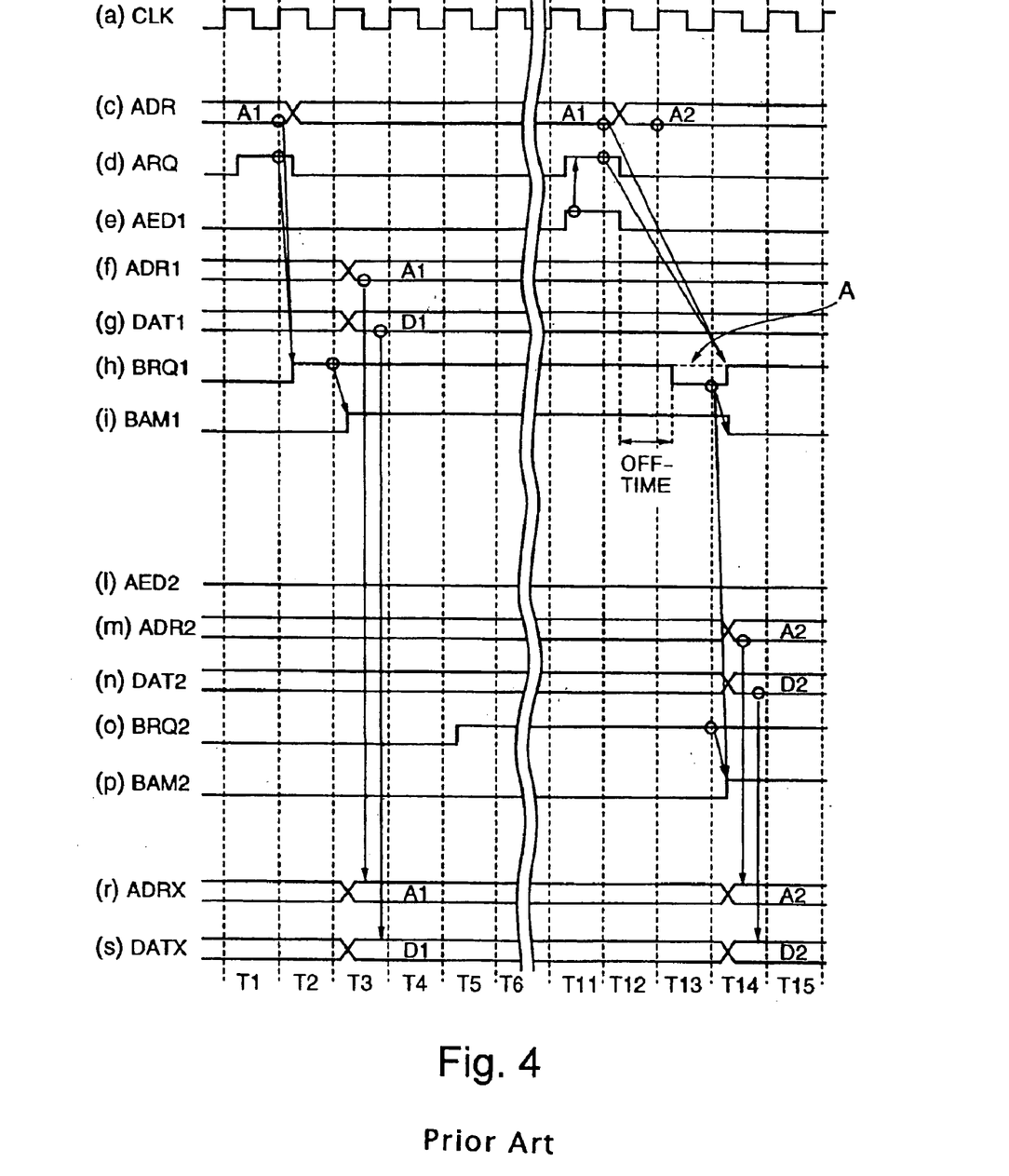
FIG. 4 is a timing chart explaining operation in the 2nd mode of the external bus control device shown in FIG. 1.

FIG. 4 is a timing chart in case the second external bus controller 13 transmits spontaneously the external bus use request signal BRQ2.

The main differences between FIG. 4 and FIG. 2 are as follows.

(1) The access request to the first SRAM is issued continuously. That is, in the time period T11, the address signal ADR which the CPU11 outputs is the address signal A1 following on the last cycle.

Figure 5:
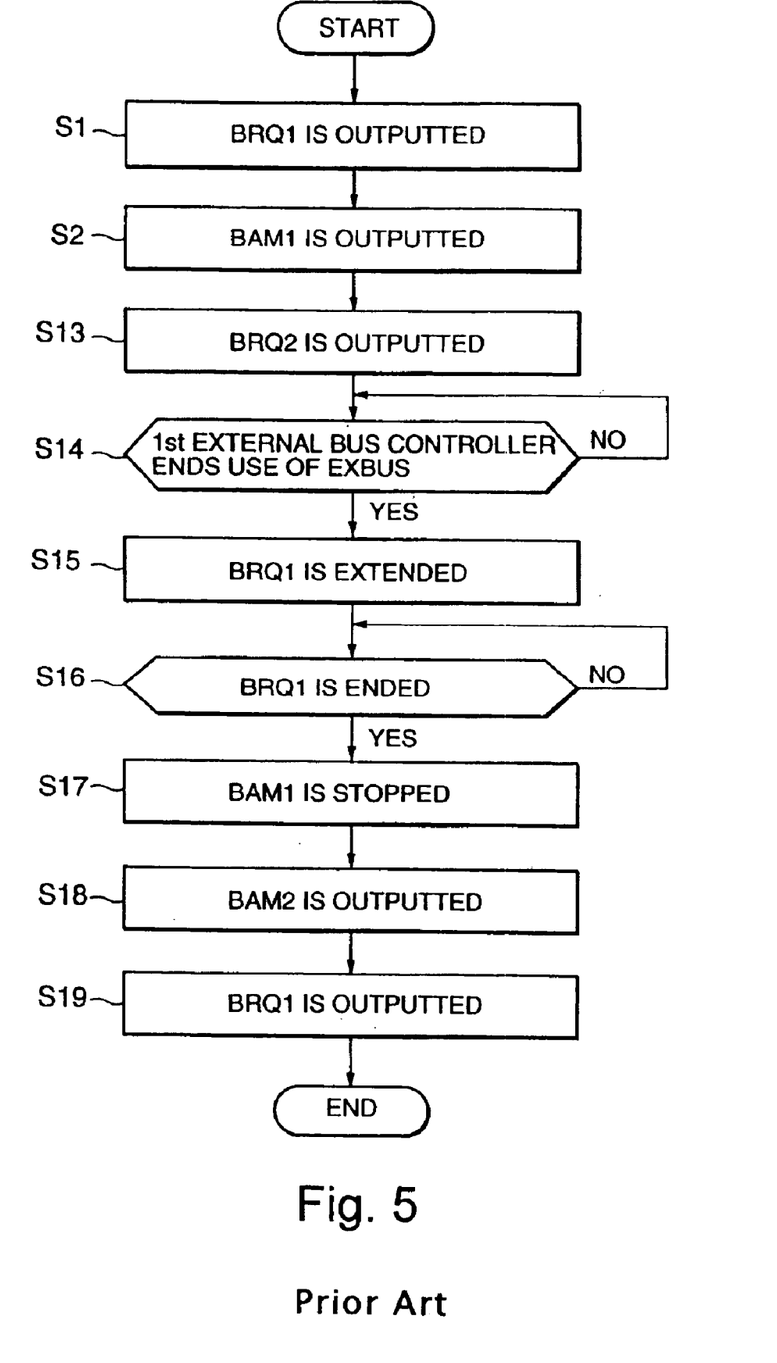
FIG. 5 is a flow chart explaining operation in the 2nd mode of the external bus control device shown in FIG. 1.

(2) The bus use request signal BRQ2 is set to the H level independently of the access request signal ARQ in the time period T5. This corresponds to Step S13 in FIG. 5.

(3) The access request signal BRQ1 is again set to the H level in the time period T14. This corresponds to Step S19 in FIG. 5.

In this second mode, the external bus use request signal BRQ2 is outputted asynchronously with the access request signal ARQ which the CPU 11 outputs. (The external bus use request signal BRQ2 enters into an active state asynchronously with the CPU 11.)

Such an access request has a possibility of being ignored when as follows. That is, as shown in FIG. 4, it is in the case where the CPU 11 tries to access the first SRAM in two continuous cycles.

In such a case, the H level of the external bus use request signal BRQ1 is maintained according to the address A1 outputted from the CPU 11, as shown by the dotted line indicated by an arrow A in FIG. 4. Consequently, in the following cycle, the first SRAM is accessed again and an access to DRAM is ignored. As a result, data of DRAM may be destroyed.

In this second mode, in order to receive an access request signal BRQ2, whenever access is completed, the level of the external bus use request signal BRQ1 is changed to the L level. That is, the external bus use request signal BRQ1 is compulsorily set as the L level after the off-time period so that the access request signal BRQ2 may be received. Thereby, the external bus use permission is moved from the external bus controller 12 to the external bus controller 13.

As mentioned above, in the conventional external bus control device 1, especially in order to perform the second mode, the first external bus controller 12 supervise (monitors) the external bus use request signal BRQ2 outputted from the second external bus controller 13.

However, in the above-mentioned conventional external bus control device, when newly adding an external bus controller (it corresponds to the second external bus controller.) of a passive type/spontaneous type, the external bus use request signal of this passive type external bus controller needs to be made to input into all other external bus controllers (it corresponds to the first external bus controller.). Therefore, in other external controllers, new circuit designing for receiving this external bus use request signal is needed. This new designing needs to be changed whenever the number of the external bus controllers which should be added is changed (i.e., whenever the number of the devices connected to the external bus EXBUS is changed).

Therefore, it is difficult to shorten the manufacture period of the system containing the external bus control device. Thereby, the subject that replying to a user's needs immediately become difficult occurs.

Moreover, when the external bus controller (it corresponds to the second external bus controller.) of a passive type/spontaneous type is deleted and the CPU accidentally specified an address which corresponds to this external bus controller, other subjects that a system carry out a stack occurs.

Therefore, in the conventional external bus control device, an addition and deletion of an external bus controller is not easy.

The present invention is made in order to solve the above-mentioned subject, and one object of the present invention is to provide a bus control system and a bus control method of carrying out easily an addition and deletion of the external bus controller in an external bus control device.

SUMMARY OF THE INVENTION

According to one aspect of the present invention, there is provided a bus control system which includes a bus which transfers data. The bus control system also includes a first bus control device corresponding to a first device which is to be connected to the bus, which outputs a first bus use request signal that the first device requires to use the bus, and which outputs a first off-time signal at a predetermined time period after suspending the output of the first bus use request signal. The bus control system also includes a second bus control device corresponding to a second device which is to be connected to the bus, which outputs a second bus use request signal that the second device requires to use the bus, and which outputs a second off-time signal during a predetermined time period after suspending the output of the second bus use request signal. The bus control system also includes a bus arbiter which selectively outputs a bus use grant signal to the first and second bus control devices in response to the first and second bus use request signals and which halts the output of the bus use grant signal while receiving the first and second off-time signals.

According to another aspect of the present invention, there is provided a method of controlling system having a bus transferring data, a first device connected to the bus, and a second device connected to the bus. The method includes the following steps. That is, (a) issuing a first bus use request which requires that the first device uses the bus; (b) granting the first bus use request and giving the right for using the bus to the first device; (c) using the bus by the first device; (d) issuing a second bus use request which requires that the second device uses the bus; (e) withdrawing the first bus use request; (f) generating an inhibit signal during a predetermined time period just after step (e), the inhibit signal inhibiting the first and second devices from using the bus; and (g) granting the second bus use request and giving the right for using the bus to the second device after the predetermined time period.

The above and further objects and novel features of the invention will more fully appear from the following detailed description, appended claims, and accompanying drawings.

DETAILED DESCRIPTION OF THE PREFERRED EMBODIMENT

A bus control system according to preferred embodiments of the present invention will be explained hereinafter with reference to figures. In order to simplify explanation, like elements are given like or corresponding reference numerals through this specification and figures. Dual explanations of the same elements are avoided.

First Preferred Embodiment

Figure 6:
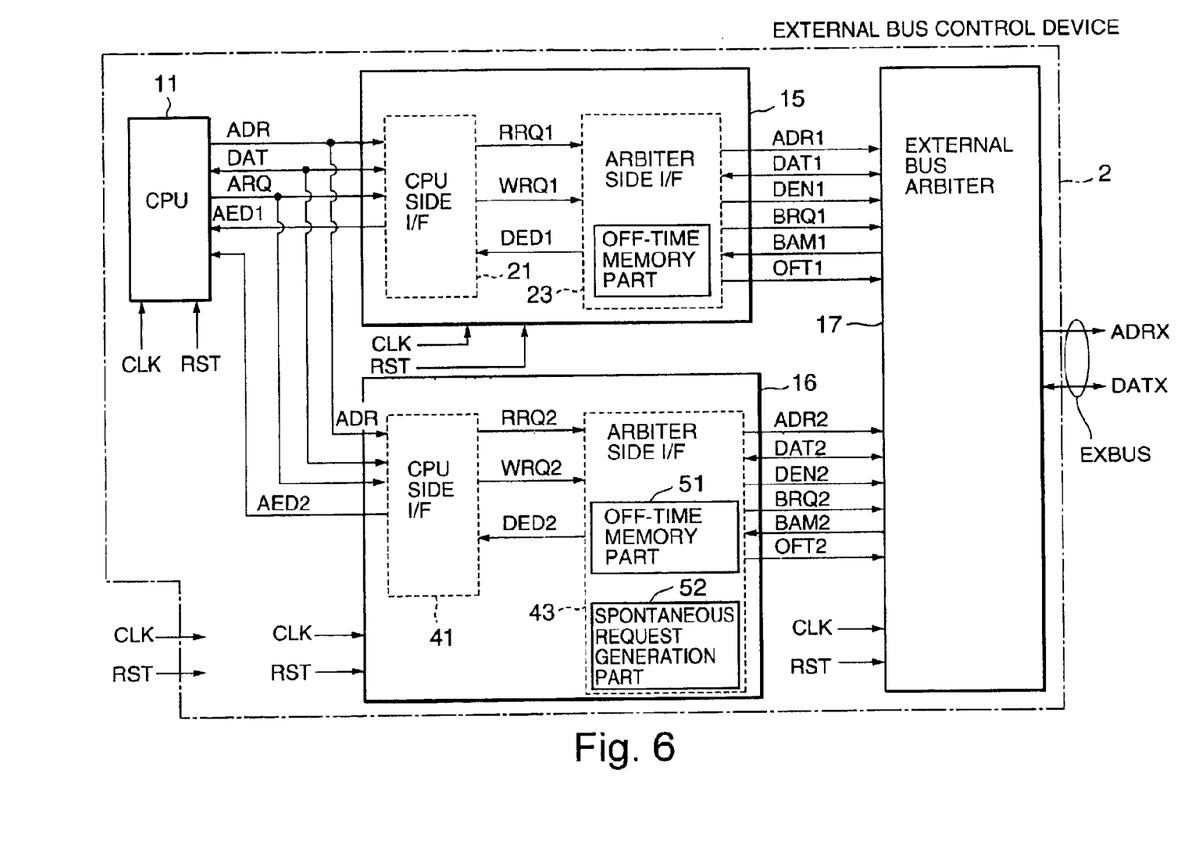
FIG. 6 is the block diagram showing the structure of the external bus control device of the 1st preferred embodiment of present invention.

FIG. 6 is a block diagram showing the structure of the external bus control device of the first preferred embodiment of the present invention.

The points different from the external bus control device 1 with the external bus control device 2 shown in FIG. 1 are mainly the following points.

(1) The arbiter side I/F 23 in the first external bus controller 16 (external bus controller of a passive type) which outputs the external bus use request signal BRQ1 only synchronizing with operation of the CPU output the off-time signal OFT1 to the external bus arbiter 17 based on off-time data stored in the off-time memory part 31.

(2) The arbiter side I/F 43 in the second external bus controller 16 (external bus controller a passive type/ spontaneous type) which can output the external bus use request signal BRQ2 asynchronously with operation of the CPU output the off-time signal OFT2 to the external bus arbiter 17 based on off-time data stored in the off-time memory part 51.

(3) The external bus use request signal BRQ2 outputted from the arbiter side I/F 43 is not outputted to the first external bus controller 15. That is, the first external bus controller does not supervise an operation of the second external bus controller.

The structure of the others in the external bus control device 2 of FIG. 6 is the same as that of the external bus control device 1 shown in FIG. 1.

Next, the case where the second external bus controller 16 outputs the external bus use request signal BRQ2 asynchronously with operation of the CPU 11 is explained as an example. (This operation is called the end mode.)

That is, the second external bus controller 16 outputs spontaneously the external bus use request signal BRQ2 for a refreshment request of DRAM connected to the external bus EXBUS.

Here, SRAM and DRAM are connected to the external bus EXBUS. The address signal A1 is an address which specifies SRAM, and the address signal A2 is an address which specifies DRAM. In addition, the first external bus controller 15 performs transmission and reception of data to this SRAM, and the second external bus controller 16 performs transmission and reception of data to this DRAM.

Figure 7:
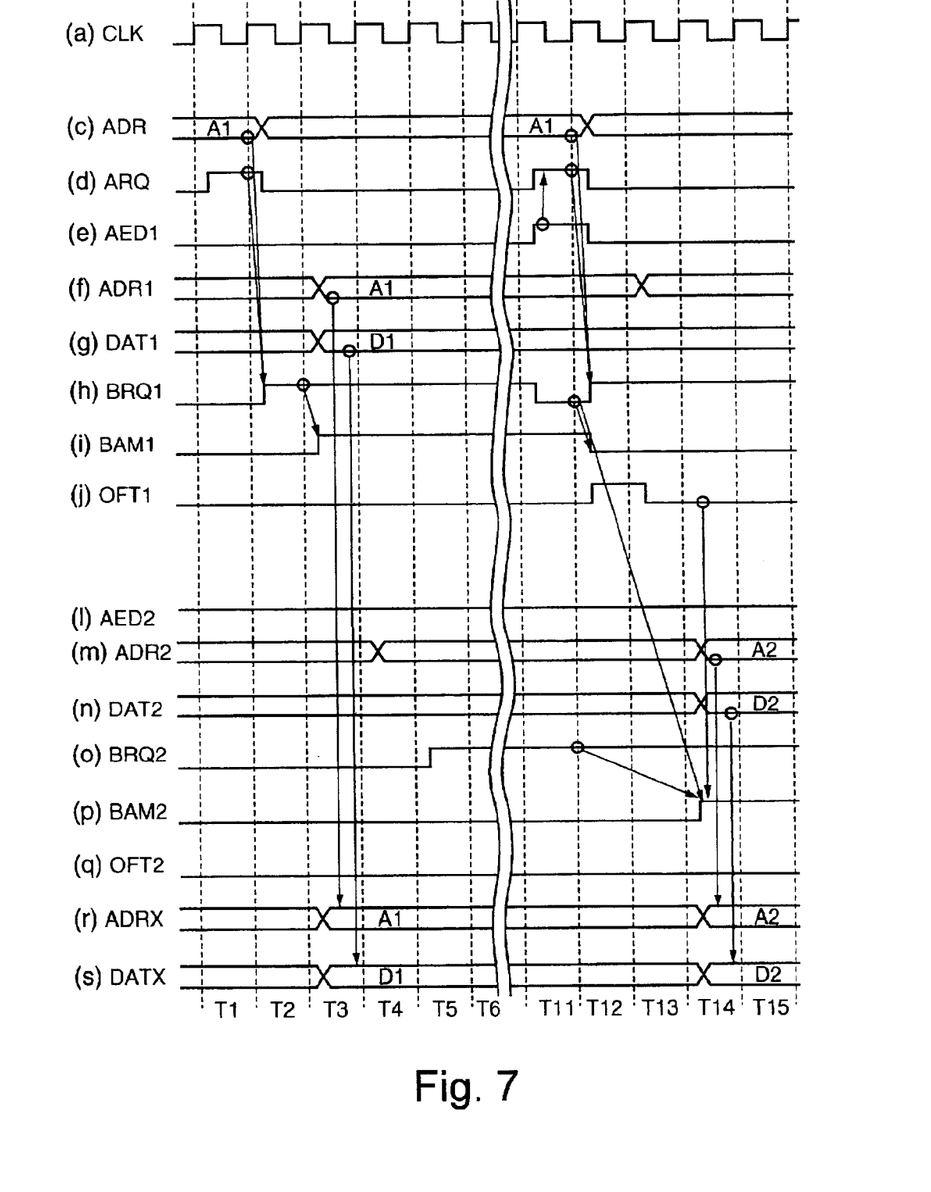
FIG. 7 is a timing chart explaining operation of the external bus control device shown in FIG. 6.

FIG. 7 is a timing chart in case the second external bus controller 16 transmits spontaneously the external bus use request BRQ2.

First, the CPU 11 outputs the address signal A1 to the first external bus controller 15 as an address signal ADR. Furthermore, the CPU 11 outputs the access request signal ARQ having the H level. After that, access to SRAM is started. In addition, when this time access is the write-in operation to SRAM, the write-in request WRQ1 is outputted, and when this time access is read-out operation from SRAM, the read-out request RRQ1 is outputted. However, explanation is omitted about these requests. (time period T1)

The first external bus controller 15 outputs the external bus use request signal BRQ1 having the H level in response to the access request signal ARQ having the H level. (time period T2)

Next, the external bus arbiter 17 detects that the external bus use request signal BRQ2 of the H level does not exist and responses the external bus use permission signal BAM1 of the H level to the first external bus controller 15 in response to the H level of the external bus use request signal BRQ1. Furthermore, the first external bus controller 15 outputs the address signal A1 to the external bus arbiter 17 as the address ADR1. Furthermore, the first external bus controller 15 outputs the data signal D1 to the external bus arbiter 17 as the data signal DAT1.

The address signal A1 is outputted to the external bus EXBUS as the address signal ADRX and the data D1 is outputted to the external bus EXBUS as the data signal DATX based on the transition of the L level to the H level of the external bus use permission signal BAM1. (time period T3)

After that, for example, read-out operation from SRAM is performed.

Next, it enters in the period which DRAM must be refreshed. Therefore, in the time period T5, the bus use request signal BRQ2 having the H level is outputted based on data stored in the spontaneous request signal memory part 52, but independently of the access request signal ARQ (time period T5)

Next, after access to SRAM is completed, the first external bus controller 15 outputs the access end signal AED1 having the H level to the CPU 11. The CPU 11 receives the access end signal AED1 having the H level, and outputs again the access request signal ARQ having the H level. The H level of the access request signal ARQ indicates that the following access cycle is started. Moreover, in the following cycle, the CPU11 outputs the address signal A1 to the first bus controller 15 as the address ADR, in order to start access to the same SRAM. Furthermore, the first external bus controller 15 sets the H level of the external bus access request signal BRQ1 to the L level at least 1 clock time period in response to the access end signal AED1 having the H level. Here, it is to be noted that the timing at which the external bus access request signal BRQ1 is set to the L level and the timing at which the access end signal AED1 is set to the H level are almost simultaneous. (time period T11)

Next, the external bus arbiter 17 changes the H level of the external bus use permission signal BAM1 to the L level in response to the external bus access request signal BRQ1 having the L level. The first bus controller 15 outputs the off-time time signal OFT1 having the H level to the external bus arbiter 17 at a timing when the external bus use permission signal BAM1 is changed to the L level. The H level the off-time period of this off-time signal OFT1 is maintained during the off-time period about SRAM stored in the off-time memory part 23.

The first bus controller 15 detects the external bus use permission signal BAM1 having the L level and the external bus access request signal BRQ2 having the H level, and receives the access request to DRAM.

In addition, since the off-time signal OFT1 is the H level, access to DRAM is not yet started. That is, the L level of the external bus use permission signal BAM2 is still maintained. After that, although the first external bus controller 15 outputs BRQ1 having the H level, since the external bus use permission signal BAM1 is the L level, access to SRAM is not started (time period T12)

Next, the external bus arbiter 17 detects that the off-time OFT1 is the L level, and responses the external bus use permission signal BAM2 having the H level to the second external bus controller 13.

The second external bus controller 16 outputs the data signal D2 to the external bus arbiter 17 as the data signal DAT2. The address signal A2 is outputted to the external bus EXBUS as the address signal ADRX and the data signal D2 is outputted to the external bus EXBUS as the data signal DATX based on the transition of the L level to the H level of the external bus use permission signal BAM2. Access to DRAM is started after this. That is, it means that the right for using the external bus EXBUS has moved from the first external bus controller 15 to the second external bus controller 16. (time period T14)

In addition, in the conventional art, the off-time period is defined by the L level of the external bus use request signal BRQ1. On the other hand, in the present invention, the off-time period is defined by the H level of the off-time signal OFT1. At this point, the present invention differs from the conventional art.

After the external bus use request signal BRQ2 changes from the H level to the L level, the timing which changes to the H level again is not shown in FIG. 7. Moreover, the timing at which the external bus use permission signal BAM2 changes to the L level is not shown.

The above-mentioned timing of the second external controller is the same as that of the timing the first external controller.

Figure 8:
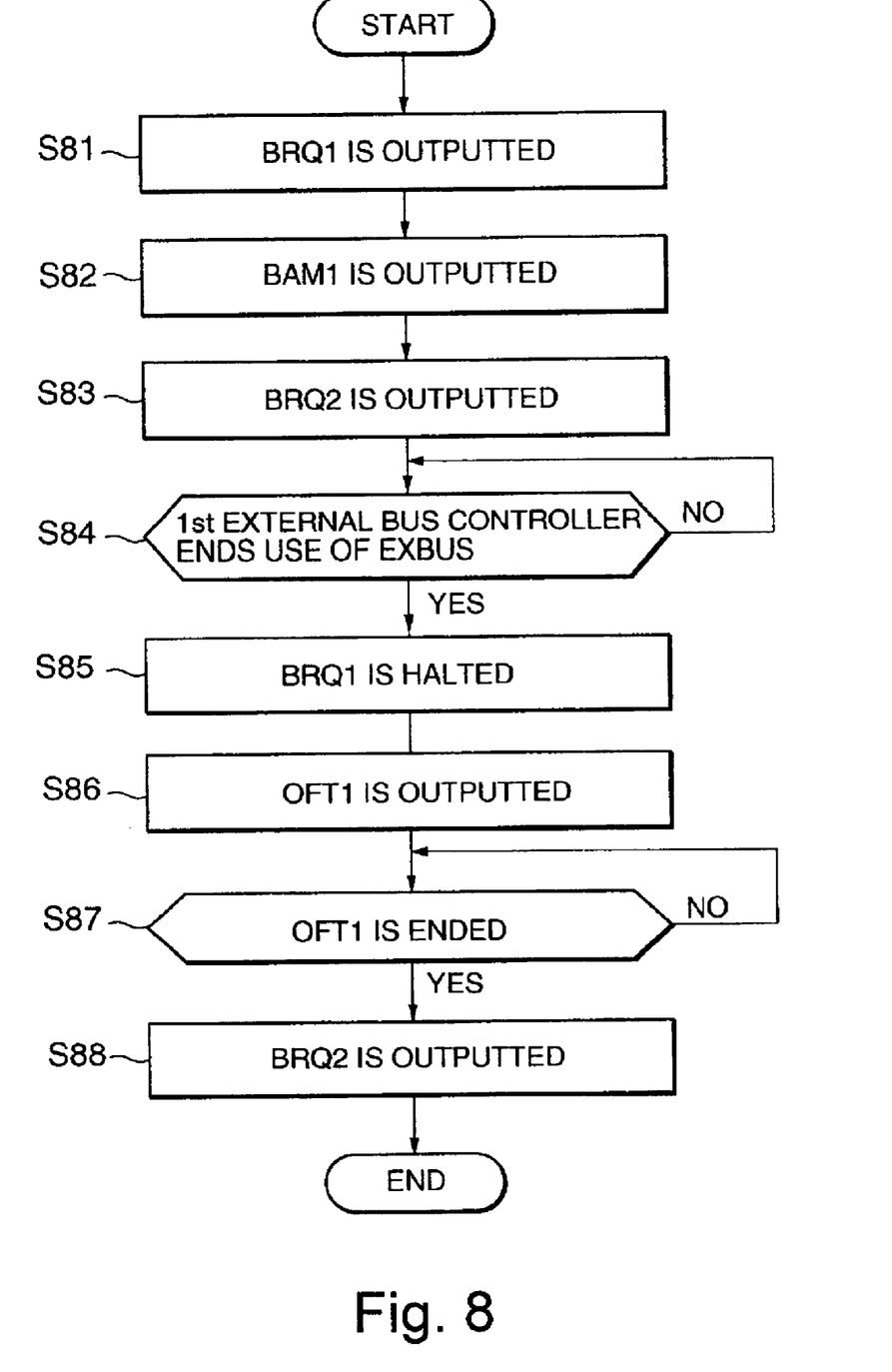
FIG. 8 is a flow chart explaining operation of the external bus control device shown FIG. 6.

FIG. 8 is the summary of the explanation of operation shown in FIG. 7.

The external bus use request signal BRQ1 is outputted. (Step S81)

The external bus use permission signal BAM1 is outputted. (Step S82)

The external bus use request signal BRQ2 is outputted. (Step S83)

Whether the first external bus controller 15 ends use of the external bus EXBUS is judged. (Step S84)

When the first external bus controller 12 does not end use of the external bus, Step S84 is repeated. (Step S84: NO)

When the first external bus controller 15 ends use of the external bus, the output of the external bus use request signal BRQ1 is halted. (Step S86)

The off-time signal OFT1 is outputted. (Step S86)

Whether the output of the off-time signal OFT1 is ended is judged. (Step S87)

When the output of the off-time signal OFT1 is not ended, Step S87 is repeated. (Step S87)

When the output of the off-time signal OFT1 is ended, the external bus use request signal BRQ2 is outputted. (Step S88)

In the external bus control device in this preferred embodiment, when newly adding an external bus controller of a passive type/spontaneous type, the external bus use request signal of this passive type of external bus controller does not need to be outputted to other external bus controllers.

Therefore, in other external controllers, the new circuitry (designing new circuit) for receiving this external bus use request signal becomes unnecessary. That is, whether the number of the external bus controllers which should be added is changed or the number of the devices connected to the external bus EXBUS is changed, design change of a circuit is unnecessary.

Therefore, it is enabled to shorten the manufacture period of the system containing an external bus control device, and is enabled to reply to a user's needs immediately therefore.

Second Preferred Embodiment

Figure 9:
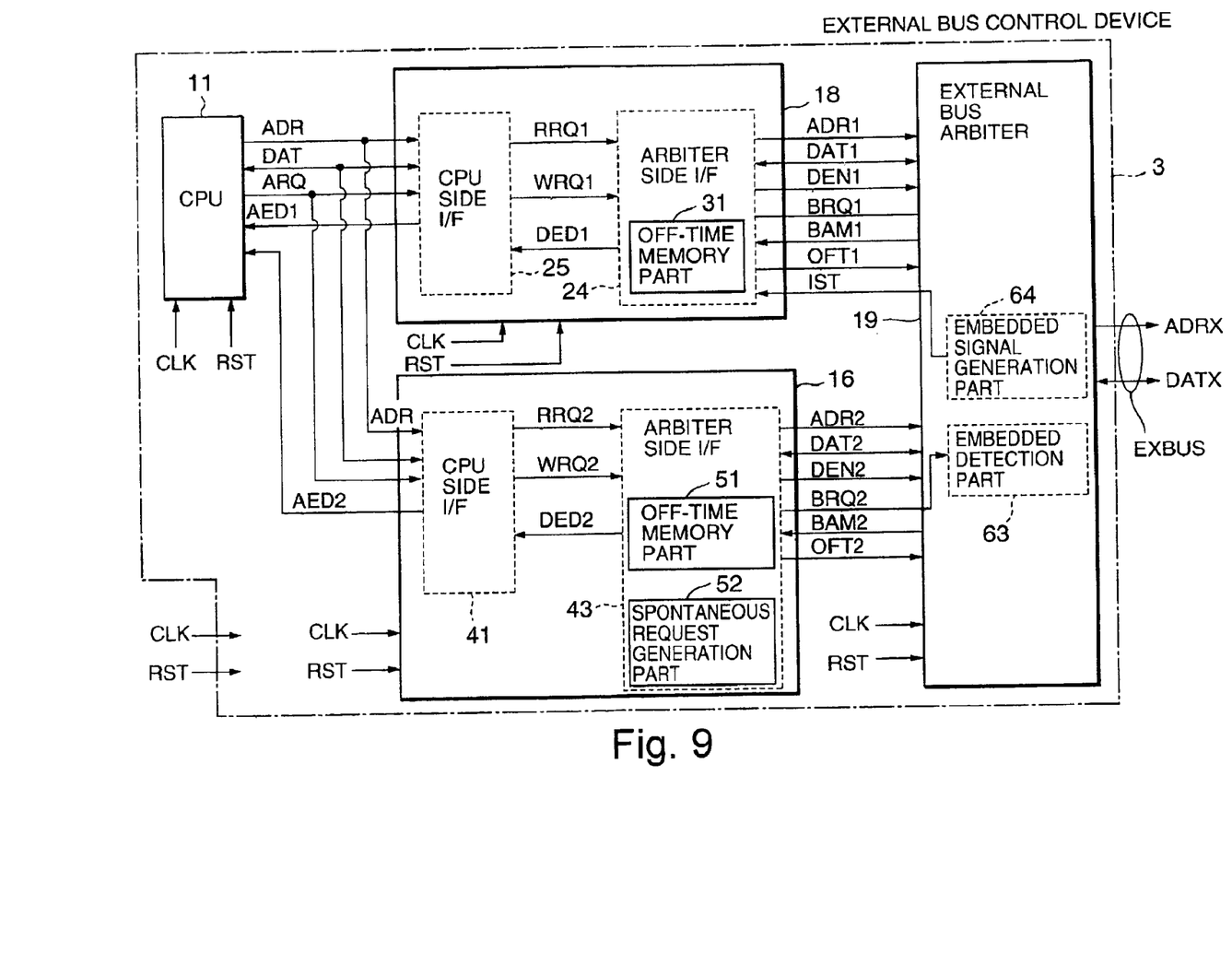
FIG. 9 is the block diagram showing the structure of the external bus control device of the 2nd preferred embodiment of present invention.

FIG. 9 is a block diagram showing the structure of the external bus control device of the second preferred embodiment of the present invention.

The main differences between the external bus control device 3 of FIG. 9 and the external bus control device 2 of FIG. 6 are as follows.

(1) The second external bus controller 16 outputs the external bus use request signal BRQ2 based on the reset signal RST. In detail, when the second external bus controller 16 is embedded in the external bus control device (i.e., when DRAM is connected to the external bus EXBUS), the external bus use request signal BRQ2 is outputted during the reset.

(2) The embedded detection part 63 which detects that the second external bus controller 16 is embedded is provided in the external bus arbiter 19. This embedded detection part 63 detects the external bus use request signal BRQ2.

(3) The embedded signal generation part 64 which generates the embedded signal IST is provided in the external bus arbiter 19. This embedded signal IST is a signal which notifies that the second external bus controller 16 is embedded (mounted) in the external bus control device to the first external bus controller.

(4) The arbiter side I/F 24 in the first external bus controller 18 which outputs the external bus use request signal BRQ1 synchronizing with operation of the CPU receive the embedded signal IST. This embedded signal IST is a signal which indicates that the second external bus controller 16 is embedded in the external bus control device 3.

Figure 10:
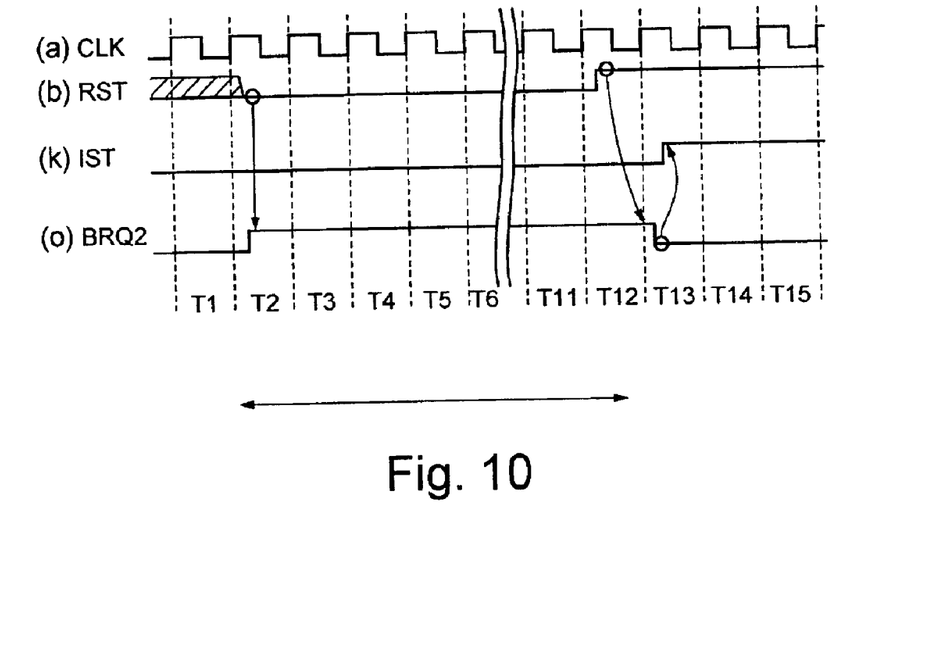
FIG. 10 is a timing chart explaining operation of the external bus control device shown in FIG. 9.
Figure 11:
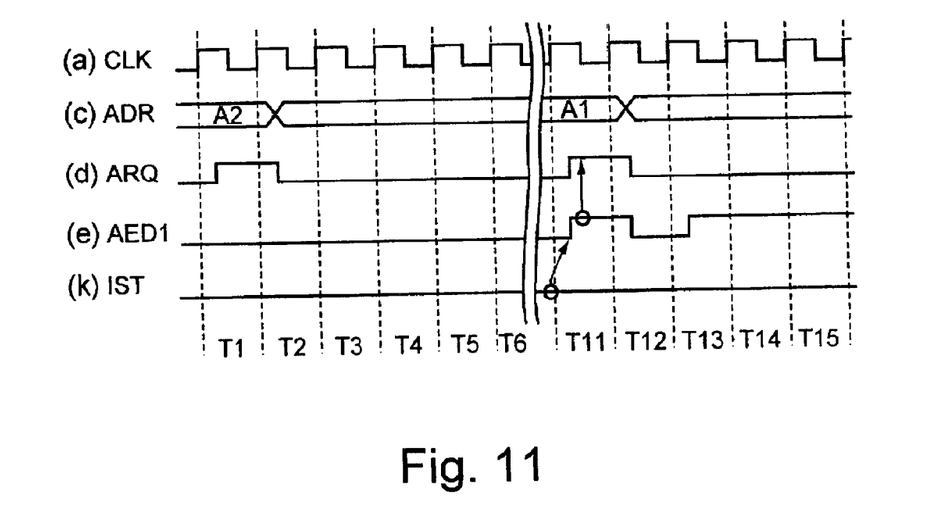
FIG. 11 is a timing chart explaining operation of the external bus control device shown in FIG. 9.

Next, operation of this preferred embodiment is explained by using FIG. 10 and FIG. 11.

FIG. 10 is a timing chart explaining operation of this embodiment of the present invention. This timing chart shows the reset period immediately after supplying a power supply to the system including the external bus control device. Moreover, this timing chart shows the case where the second external bus controller 16 is embedded in the external bus control device.

First, a power supply a supplied to a system. A clock CLK begins to be supplied to the external bus control device 3. The level of the reset signal RST is still unfixed (the states of "don't care"). (time period T1)

Then, the level of the reset signal RST is decided on the L level (active state). If the reset signal enters into an active state, the second external bus controller 16 outputs the external bus use request signal BRQ2 having the H level. (time period T2)

Then, the L level of the reset signal RST is maintained from the time period T2 to the time period T11. Initialization of the system is performed in the period of this L level.

Next, the reset signal RST changes from the L level to the H level. Therefore, initialization of the system is completed. (time period T12)

Next, the external bus use request signal BRQ2 changes to the L level in response to the H level of the reset signal RST. Moreover, the embedded signal IST changes to the H level in response to the external bus use request signal BRQ2 having the L level. (time period T13)

The H level of the embedded signal IST is held at an embedded signal memory part 64. The embedded signal IST of this held H level is outputted to the first external bus controller 18 in the normal operation period after a reset period.

In the normal operation period, since the first external bus controller 18 receives the embedded signal IST having the H level, the first external bus controller 18 can recognize that the second external bus controller 16 is embedded in the external bus control device 3. Therefore, the external bus control device 3 operates like the first preferred embodiment.

When the second external bus controller 16 is not embedded in the external bus control device 3, the external bus use request signal BRQ2 is not outputted. Therefore, the embedded signal memory part 64 outputs the embedded signal IST having the L level. In the normal operation period, since the first external bus controller 18 receives the embedded signal IST having the L level, the first external bus controller 18 can recognize that the second external bus controller 16 to not embedded in the external bus control device 3. Therefore, the first external bus controller 18 operates as that the second external bus controller 16 does not exist. In other words, the whole system operates as that DRAM is not connected to the external bus EXBUS, for example.

FIG. 11 is other timing charts explaining operation of this embodiment. This timing chart shows an operation in the normal operation period. Moreover, this timing chart is a wave form chart in case that the CPU 11 accidentally specify the second external bus controller 16, while the second external bus controller 16 is not embedded in the external bus control device.

In the normal operation period, the address signal A2 relevant to DRAM not connected to the external bus EXBUS is accidentally outputted from the CPU 11 with the access request signal ARQ. (time period T1)

Here, since DRAM is not connected to the external bus EXBUS, the second external bus controller is not embedded in the external bus control device 3, either. Therefore, the access end signal AED2 is not outputted, either. Therefore, the response to the address signal A2 will not be outputted to the CPU 11 and thereby a system will carry out a stack. Then, the first external bus controller 18 outputs the access end signal AED1 having the H level to the CPU 11 in response to the embedded signal IST having the L level instead of the second external bus controller. Other operation is the same as that of the first preferred embodiment.

As mentioned above, in the external bus control device 3 of this preferred embodiment, even when the second external bus controller 16 is deleted and the CPU 11 accidentally specifies the second external bus controller 16, the access end signal AED1 is outputted instead of the access end signal AED2. Therefore, a system cannot be stopped.

Therefore, according to this preferred embodiment, an external bus controller is easily reducible.

As explained above, when newly adding an external bus controller of a passive type/spontaneous type, the external bus use request signal of this passive type of external bus controller does not need to be outputted to other external bus controller. Therefore, in other external controllers, the new circuitry (designing new circuit) for receiving this external bus use request signal becomes unnecessary. That is, whether the number of the external bus controllers which should be added is changed or the number of the devices connected to the external bus is changed, design change of a circuit is unnecessary.

Therefore, it is enabled to shorten the manufacture period of the system containing an external bus control device, and is enabled to reply to a user's needs immediately therefore.

While the preferred form of the present invention has been described, it is to be understood that modifications will be apparent to those skilled in the art without departing from the spirit of the invention. The scope of the invention, namely, is to be determined solely by the following claims.

What is claimed is:

1. A bus control system, comprising:
   a bus which transfers data;
   a first bus control device corresponding to a first device which is to be connected to the bus, which outputs a first bus use request signal that the first device requires to use the bus, and which outputs a first off-time signal at a predetermined time period after suspending the output of the first bus use request signal;
   a second bus control device corresponding to a second device which is to be connected to the bus, which outputs a second bus use request signal that the second device requires to use the bus, and which outputs a second off-time signal during a predetermined time period after suspending the output of the second bus use request signal; and
   a bus arbiter which selectively outputs a bus use grant signal to the first and second bus control devices in response to the first and second bus use request signals and which halts the output of the bus use grant signal while receiving the first and second off-time signals.

2. A bus control system according to claim 1, wherein the first device is a memory device to be refreshed periodically and wherein the first bus control device has a memory part which stores data indicating a time period for refreshment of the first device.

3. A bus control system according to claim 1, wherein the first bus control device outputs a first control signal during a predetermined time period in response to a reset signal which occurs when a power supply is supplied to the system and wherein the bus arbiter outputs a second control signal to the second bus control device in response to the first control signal the second control signal indicating that the first bus control device exists in the system.

4. A bus control system according to claim 3, wherein the bus arbiter includes a signal detection circuit for detecting the second control signal from the second bus control device and a signal storing circuit for storing the second control signal.

5. A bus control system according to claim 1, wherein the first and second bus control devices output a first control signal during a predetermined time period in response to a reset signal which occurs when a power supply is supplied to the system and wherein the bus arbiter outputs a second control signal to one of the bus control devices in response to the first control signal output from the other of the bus control devices, the second control signal indicating that the first and second bus control devices exist in the system.

6. A bus control system according to claim 5, wherein the bus arbiter includes a signal detection circuit for detecting the second control signal from the second bus control device and a signal storing circuit for storing the second control signal.

7. A bus control system according to claim 1, wherein the first bus control device has a first interface circuit connected to the bus arbiter and a second interface circuit connected to the CPU.

8. A bus control system according to claim 7, wherein the first interface circuit includes an off-time storing circuit.

9. A bus control system according to claim 1, wherein the second bus control device has a third interface circuit connected to the bus arbiter and a fourth interface circuit connected to the CPU.

10. A bus control system according to claim 9, wherein the third interface circuit includes an off-time storing circuit and a spontaneous request generation circuit.

11. A bus control system comprising:
    a bus which transfers data;
    a first bus control device corresponding to a first device which is planned to connect to the bus, which outputs a first bus use request signal that the first device requires to use the bus, and which outputs a first off-time signal at a predetermined time period after suspending the output of the first bus use request signal;
    a second bus control device corresponding to a second device which is to be connected to the bus, which outputs a second bus use request signal that the second device requires to use the bus, and which outputs a second off-time signal during a predetermined time period after suspending the output of the second bus use request signal;
    a bus arbiter which selectively outputs a bus use grant signal to the first and second bus control devices in response to the first and second bus use request signals and which halts the output of the bus use grant signal while receiving the first and second off-time signals; and
    a central processing unit which outputs an address signal specifying the first and second bus control devices,
    wherein one of the bus control devices connected to the bus outputs a response signal to the central processing unit, in response to an address signal which corresponds to the other of the bus control devices not connected to the bus and which output from the central processing unit.

12. A bus control system according to claim 11, wherein the first device is a memory device to be refreshed periodically and wherein the first bus control device has a memory part which stores data indicating a time period for refreshment of the first device.

13. A bus control system according to claim 11, wherein the first bus control device outputs a first control signal during a predetermined time period in response to a reset signal which occurs when a power supply is supplied to the system and wherein the bus arbiter outputs a second control signal to the second bus control device in response to the first control signal, the second control signal indicating that the first bus control device exists in the system.

14. A bus control system according to claim 13, wherein the bus arbiter includes a signal detection circuit for detecting the second control signal from the second bus control device and a signal storing circuit for storing the second control signal.

15. A bus control system according to claim 11, wherein the first and second bus control devices output a first control signal during a predetermined time period in response to a reset signal which occurs when a power supply is supplied to the system and wherein the bus arbiter outputs a second control signal to one of the bus control devices in response to the first control signal output from the other of the bus control devices, the second control signal indicating that the first and second bus control devices exist in the system.

16. A bus control system according to claim 15, wherein the bus arbiter includes a signal detection circuit for detecting the second control signal from the second bus control device and a signal storing circuit for storing the second control signal.

17. A bus control system according to claim 11, wherein the first bus control device has a first interface circuit connected to the bus arbiter and a second interface circuit connected to the CPU.

18. A bus control system according to claim 17, wherein the first interface circuit includes an off-time storing circuit.

19. A bus control system according to claim 11, wherein the second bus control device has a third interface circuit connected to the bus arbiter and a fourth interface circuit connected to the CPU.

20. A bus control system according to claim 19, wherein the third interface circuit includes an off-time storing circuit and a spontaneous request generation circuit.

21. A method of controlling system having a bus transferring data, a first device connected to the bus, and a second device connected to the bus, the method comprising:

(a) issuing a first bus use request which requires that the first device uses the bus;

(b) granting the first bus use request and giving the right for using the bus to the first device;

(c) using the bus by the first device;

(d) issuing a second bus use request which requires that the second device uses the bus;

(e) withdrawing the first bus use request;

(f) generating an inhibit signal during a predetermined time period just after step (e) the inhibit signal inhibiting the first and second devices from using the bus; and (g) granting the second bus use request and giving the light for using the bus to the second device after the predetermined time period.

* * * * *